(12) United States Patent
Tomioka et al.

(10) Patent No.: US 9,968,998 B2
(45) Date of Patent: May 15, 2018

(54) INJECTION DEVICE AND MOLDING APPARATUS

(71) Applicant: Toshiba Kikai Kabushiki Kaisha, Chiyoda-ku, Tokyo (JP)

(72) Inventors: Satoshi Tomioka, Zama (JP); Ryusuke Nakata, Zama (JP)

(73) Assignee: TOSHIBA KIKAI KABUSHIKI KAISHA, Chiyoda-ku, Tokyo (JP)

( * ) Notice: Subject to any disclaimer, the term of this patent is extended or adjusted under 35 U.S.C. 154(b) by 14 days.

(21) Appl. No.: 15/079,558

(22) Filed: Mar. 24, 2016

(65) Prior Publication Data

US 2016/0279701 A1  Sep. 29, 2016

(30) Foreign Application Priority Data

Mar. 27, 2015  (JP) ................. 2015-066045

(51) Int. Cl.
*B22D 17/20*  (2006.01)
*B22D 17/32*  (2006.01)
*B29C 45/53*  (2006.01)
*B29C 45/82*  (2006.01)

(52) U.S. Cl.
CPC ....... *B22D 17/203* (2013.01); *B22D 17/2015* (2013.01); *B22D 17/32* (2013.01); *B29C 45/531* (2013.01); *B29C 45/82* (2013.01)

(58) Field of Classification Search
CPC .. B22D 17/20; B22D 17/2015; B22D 17/203; B22D 17/32; B29C 45/531; B29C 45/82
USPC .................................................. 164/303, 314
See application file for complete search history.

(56) References Cited

U.S. PATENT DOCUMENTS

2005/0028961 A1  2/2005  Toyoshima et al.
2010/0000699 A1*  1/2010  Uchida et al. ......... B22D 17/32
164/113

FOREIGN PATENT DOCUMENTS

JP  H03-184664  8/1991
JP  2004-330267  11/2004
JP  2005-169432  6/2005

OTHER PUBLICATIONS

English Language Abstract and Translation of JPH03-184664 published Aug. 12, 1991.
English Language Abstract and Translation of JP2004-330267 published Nov. 25, 2004.
English Language Abstract and Translation of JP2005-169432 published Jun. 30, 2005.

* cited by examiner

*Primary Examiner* — Kevin P Kerns
(74) *Attorney, Agent, or Firm* — DLA Piper LLP US

(57) ABSTRACT

An injection device has an injection cylinder for driving a plunger, a gas pressure type accumulator which supplies hydraulic fluid to the injection cylinder, a hydraulic fluid supply device which supplies the hydraulic fluid to the accumulator, a pressure sensor for detecting the gas pressure of the accumulator, and a control device which controls the hydraulic fluid supply device so as to suspend the supply of the hydraulic fluid when detection value of the pressure sensor reaches a predetermined target gas pressure before injection in the state where the hydraulic fluid is supplied from the hydraulic fluid supply device to the accumulator in a molding cycle.

7 Claims, 8 Drawing Sheets

INJECTION DEVICE AND MOLDING APPARATUS

TECHNICAL FIELD

The present invention relates to an injection device and a molding apparatus (molding machine) injecting a molding material into a mold (die). The molding apparatus is for example a die casting machine or injection molding machine.

BACKGROUND ART

Known in the art is an injection device supplying a hydraulic fluid from an accumulator to an injection cylinder and thereby driving a plunger connected to a piston of the injection cylinder and injecting the molding material into the mold by the plunger (for example Patent Literature 1 and 2). As the accumulator, in general, a gas pressure type which discharges the hydraulic fluid by utilizing the pressure of a compressed gas (for example air) has been utilized.

In the injection device in Patent Literature 1, in at least the latter half of the process of injecting the molding material into the mold (including boosting), the accumulator is kept in a state where the discharge of hydraulic fluid to the injection cylinder is permitted. Further, the injection cylinder is kept in a state allowing discharge of the hydraulic fluid in front of the piston along with forward movement of the piston. Accordingly, a final pressure (end pressure) of the molding material filled in the mold is determined according to the pressure of the accumulator. Therefore, Patent Literature 1 proposes a technique of discharging or filling the gas of the accumulator so that the required final pressure is suitably obtained.

In the injection device in Patent Literature 2, in order to make discharge or filling of gas of the accumulator as explained above unnecessary, the technique of prohibiting the discharge of the hydraulic fluid from the front of the piston along with the forward movement of the piston of the injection cylinder at a suitable timing has been proposed.

CITATION LIST

Patent Literature

Patent Literature 1. Japanese Patent Publication No. 2005-169432A
Patent Literature 2. Japanese Patent Publication No. 2004-330267A

SUMMARY OF INVENTION

Technical Problem

In the technique of Patent Literature 1, however, whenever the target value of the casting pressure changes, the gas of the accumulator must be discharged or filled. As a result, the load on the worker increases. Further, in the technique of Patent Literature 2, the pressure of the accumulator exerts an influence upon the final pressure of the molding material, therefore it is better that the pressure of the accumulator be suitably adjusted. Accordingly, it has been desired that an injection device and molding apparatus capable of simply and easily adjusting the pressure of an accumulator be provided.

Solution to Problem

An injection device according to one aspect of the present invention has an injection cylinder for driving a plunger, a gas pressure type accumulator which supplies a hydraulic fluid to the injection cylinder, a hydraulic fluid supply device which supplies the hydraulic fluid to the accumulator, a pressure sensor for detecting gas pressure of the accumulator, and a control device which controls the hydraulic fluid supply device so as to suspend the supply of the hydraulic fluid when the detection value of the pressure sensor reaches a predetermined target gas pressure before injection in a state where the hydraulic fluid is supplied from the hydraulic fluid supply device to the accumulator in a molding cycle.

Preferably, the injection device further has an input device which accepts input of a target value of final pressure of the molding material. The pressure of the gas of the accumulator before injection changes in accordance with the change of the target value of the final pressure which is input.

Preferably, the accumulator has a piston for separating the hydraulic fluid and the gas. The control device sets the target gas pressure before injection based on the target value of the final pressure which is input.

Preferably, the control device calculates a pressure $P_B$ as the target gas pressure before injection by entering the target value of the final pressure which is input for a pressure $P_C$ in a numerical formula in which a pressure $P_X$ obtained by a numerical formula converting the pressure $P_C$ which the plunger receives from the molding material to the pressure $P_X$ of the gas chamber of the accumulator is entered for a pressure $P_A$ in a numerical formula calculating the pressure $P_B$ of the gas chamber at the time when a hydraulic fluid having a volume $V_U$ is supplied to the accumulator having the pressure $P_A$ of the gas chamber.

Preferably, the control device enters the target value of the final pressure which is input for a pressure $P_C$ in a numerical formula converting the pressure $P_C$ which the plunger receives from the molding material to a pressure $P_X$ of the gas chamber of the accumulator to calculate the pressure $P_X$ as a target gas pressure after injection, and sets the target gas pressure before injection of the next molding cycle based on that calculated target gas pressure after injection and a detection value of the pressure sensor after injection.

Preferably, the control device enters a detection value of the pressure sensor in a state where the hydraulic fluid is wholly discharged from the accumulator for a pressure $P_X$ in a numerical formula converting the pressure $P_X$ of the gas chamber in the accumulator to a pressure $P_C$ which the plunger receives from the molding material to calculate the pressure $P_C$ as the minimum final pressure, and judges whether the target value of the final pressure which is input is the minimum final pressure or more.

Preferably, the control device enters a value which is input from the input device or a constant value which the control device holds for a pressure $P_B$ in a numerical formula in which a pressure $P_A$ obtained by a numerical formula calculating the pressure $P_A$ based on the pressure $P_B$ in case where the pressure $P_B$ of the gas chamber becomes the pressure $P_A$ due to discharge of the hydraulic fluid of a volume $V_U$ from the accumulator is entered for a pressure $P_X$ in a numerical formula converting the pressure $P_X$ of the gas chamber of the accumulator to a pressure $P_C$ which the plunger receives from the molding material to calculate the pressure $P_C$ as a maximum final pressure, and judges whether the target value of the final pressure which is input is the maximum final pressure or less.

Preferably, the hydraulic fluid supply device has a pump for supplying the hydraulic fluid to the accumulator and a control valve for permitting or prohibiting the flow of the hydraulic fluid from the pump to the accumulator. The control device controls the hydraulic fluid supply device so that the flow of the hydraulic fluid from the pump to the accumulator is prohibited by the control valve at the time when the detection value of the pressure sensor reaches the target gas pressure before injection in a state where the hydraulic fluid is supplied from the pump to the accumulator in the molding cycle.

A molding apparatus according to one aspect of the present invention has the above injection.

Advantageous Effect of Invention

According to the present invention, the pressure of the accumulator for injection can be simply and easily adjusted.

DESCRIPTION OF EMBODIMENTS

Below, embodiments of the present invention will be explained with reference to the drawings. Note that, in the second embodiment on, configurations the same as or similar to the configurations in the already explained embodiments are assigned the same reference notations as the reference notations assigned to the configurations of the already explained embodiments and explanations of them will be sometimes omitted. Further, in the second embodiment on, when configurations corresponding (similar) to the configurations of the already explained embodiments are assigned reference notations different from the reference notations attached to the configurations of the already explained embodiments, the matters which are not particularly noted are similar to the configurations of the already explained embodiments.

First Embodiment (Configuration of Injection Apparatus)

Figure 1:
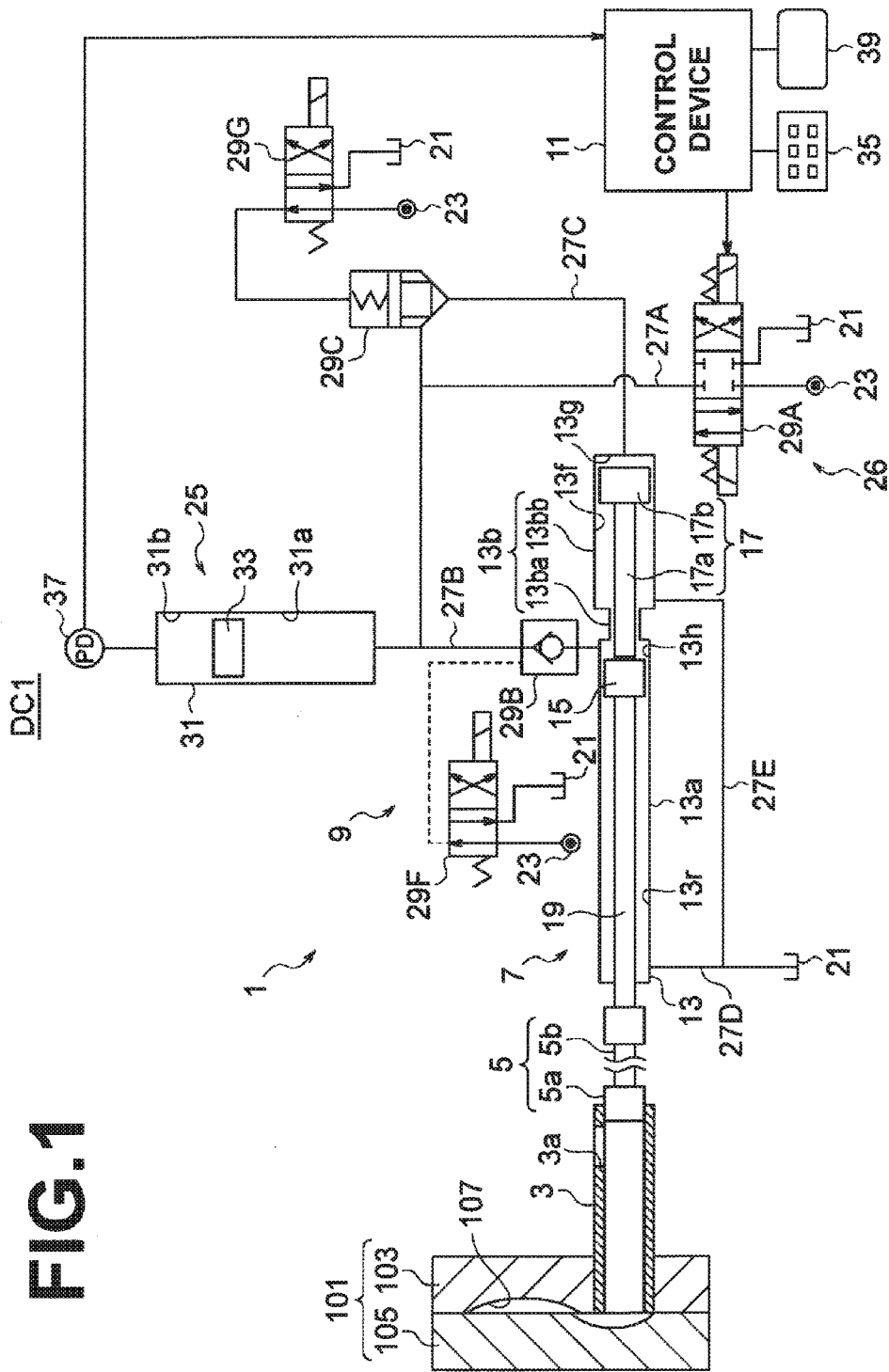
FIG. 1 A schematic view showing the configuration of the principal parts of an injection device of a die casting machine according to a first embodiment of the present invention.

FIG. 1 is a schematic view showing the configuration of the principal parts of an injection device 1 of a die casting machine DC1 according to a first embodiment of the present invention.

The die casting machine DC1 is an apparatus for injecting a molten metal (metal material in a molten state) into a mold 101 (cavity 107) and solidifying that molten metal in the mold 101 to produce a die casting (molded article). The mold 101 for example includes a fixed mold 103 and moving mold 105.

Specifically, the die casting machine DC1 has for example a not shown clamping device which opens and closes and clamps the mold 101, an injection device 1 which injects a molten metal into the clamped mold 101, a not shown ejection device which ejects the die casting from the fixed mold 103 or moving mold 105, and a control device which controls these devices. The configurations other than the injection device 1 may be basically the same as the conventional configurations, and explanations will be omitted.

The injection device 1 for example has a sleeve 3 which is communicated with a cavity 107, a plunger 5 which ejects the molten metal in the sleeve 3 into the cavity 107, an injection cylinder 7 for driving the plunger 5, a hydraulic pressure device 9 which performs supply etc. of the hydraulic fluid (for example oil) with respect to the injection cylinder 7, and a control device 11 which controls the hydraulic pressure device 9.

The configuration of the injection device 1 may also be made substantially the same as the conventional various configurations except for the configuration of the control device 11 (operation of the injection device 1). The configurations of the injection device 1 are for example as follows.

The sleeve 3 is for example a cylindrical member which is inserted in the fixed mold 103. The plunger 5 has a plunger tip 5a which can slide in a front and back direction in the sleeve 3 and as a plunger rod 5b which is fixed to the plunger tip 5a. The plunger tip 5a slides (moves forward) toward the cavity 107 inside the sleeve 3 in a state where molten metal is supplied into the sleeve 3 from a hot metal supply opening 3a formed in an upper surface of the sleeve 3, whereby the molten metal is injected into the cavity 107.

The injection cylinder 7 is for example configured by a so-called direct coupled boosting type cylinder. Specifically, for example, the injection cylinder 7 has a cylinder portion 13, an injection piston 15 and a boosting piston 17 which are capable of sliding inside the cylinder portion 13, and a piston rod 19 which is fixed to the injection piston 15 and extends outwardly from the cylinder portion 13.

The cylinder portion 13 for example has an injection cylinder portion 13a and a boosting cylinder portion 13b which is connected to the rear end of the injection cylinder portion 13a (the side opposite to the side of outward extension of the piston rod 19). The injection cylinder portion 13a and boosting cylinder portion 13b are for example cylindrical bodies with circular cross-sectional shapes of the insides. The injection cylinder portion 13a for example has a constant diameter in a longitudinal direction. The boosting cylinder portion 13b for example has a small diameter cylinder portion 13ba on the injection cylinder portion 13a side and a large diameter cylinder portion 13bb which is positioned on the opposite side to the former and has a diameter larger than the small diameter cylinder portion 13ba. The small diameter cylinder portion 13ba is for example smaller in diameter than the injection cylinder portion 13a, while the large diameter cylinder portion 13bb is for example larger in diameter than the injection cylinder portion 13a.

The injection piston 15 is arranged in the injection cylinder portion 13a. The internal portion of the injection cylinder portion 13a is partitioned by the injection piston 15 into a rod side chamber 13r on the side where the piston rod 19 extends outwardly and a head side chamber 13h on the opposite side to the former. By selective supply of the hydraulic fluid to the rod side chamber 13r and head side chamber 13h, the injection piston 15 slides in the front and back direction inside the injection cylinder portion 13a.

The boosting piston 17 has a small diameter piston portion 17a capable of sliding through the small diameter cylinder portion 13ba and a large diameter piston portion 17b capable of sliding through the large diameter cylinder portion 13bb. The internal portion of the large diameter cylinder portion 13bb is partitioned by the large diameter piston portion 17b into a front side chamber 13f on the small diameter cylinder portion 13ba side and a rear side chamber 13g on the opposite side to the former.

Accordingly, when depressurizing the front side chamber 13f, due to the difference between the pressurized area of the small diameter piston portion 17a in the head side chamber 13h and the pressurized area of the large diameter piston portion 17b in the rear side chamber 13g, the boosting piston 17 can apply a pressure higher than the pressure received from the hydraulic fluid in the rear side chamber 13g to the hydraulic fluid in the head side chamber 13h. Due to this, the injection cylinder 7 has a boosting function.

The injection cylinder 7 is coaxially arranged with respective to the plunger 5. Further, the piston rod 19 is connected through a coupling (notation is omitted) to the plunger 5. The cylinder portion 13 is provided in a fixed manner with respect to a not shown clamping device etc. Accordingly, by movement of the injection piston 15 with respect to the cylinder portion 13, the plunger 5 advances or retracts in the sleeve 3.

The hydraulic pressure device 9 for example has a tank 21 storing the hydraulic fluid, a pump 23 capable of pumping out the hydraulic fluid in the tank 21, an accumulator 25 capable of discharging the accumulated hydraulic fluid, a plurality of flow paths (first flow path 27A to fifth flow path 27E) for connecting these and the injection cylinder 7 to each other, and a plurality of valves (first valve 29A to third valve 29C, sixth valve 29F, and seventh valve 29G) for controlling the flows of the hydraulic fluid in the plurality of flow paths.

In FIG. 1, for convenience of illustration, tanks 21 and pumps 23 are shown at a plurality of positions. In actuality, these plurality of tanks 21 and pumps 23 may be combined into one tank 21 and one pump 23.

The tank 21 is for example an open tank and holds the hydraulic fluid under atmospheric pressure. The tank 21 supplies the hydraulic fluid through the pump 23 and accumulator 25 to the injection cylinder 7 and stores the hydraulic fluid discharged from the injection cylinder 7.

The pump 23 is driven by a not shown electric motor and pumps out the hydraulic fluid. The pump may be a rotary pump, plunger pump, constant capacity pump, variable capacity pump, one-direction pump, bidirectional pump (2-direction) pump, or other suitable type. Also, the electric motor for driving the pump 23 may be a DC motor, AC motor, induction motor, synchronous motor, servo motor, or other suitable type of motor. The pump 23 (electric motor) may be driven continuously during the operation of the die casting machine DC1 or may be driven according to need. The pump 23 contributes to the supply of the hydraulic fluid to the accumulator 25 (accumulation of pressure in the accumulator 25) and to the supply of the hydraulic fluid to the injection cylinder 7.

The accumulator 25 is for example a cylinder type and has a cylinder portion 31 and a piston 33 which partitions the cylinder portion 31 into a liquid chamber 31a and a gas chamber 31b. The liquid chamber 31a can store hydraulic fluid, while the gas chamber 31b is filled with gas (for example air or nitrogen). By the liquid chamber 31a being supplied with the hydraulic fluid and the piston 33 moving to the gas chamber 31b side, the gas in the gas chamber 31b is compressed and pressure is accumulated in the accumulator 25. Further, the pressure of that gas is utilized to discharge the hydraulic fluid from the liquid chamber 31a.

The first flow path 27A connects the pump 23 and the accumulator 25 (liquid chamber 31a). Due to this, for example, the hydraulic fluid is supplied from the pump 23 to the accumulator 25 and pressure can be accumulated in the accumulator 25.

The second flow path 27B connects the accumulator 25 (liquid chamber 31a) and the head side chamber 13h. Due to this, for example, by supplying the hydraulic fluid from the accumulator 25 to the head side chamber 13h, the injection piston 15 can be moved forward.

The third flow path 27C connects the accumulator 25 (liquid chamber 31a) and the rear side chamber 13g. Due to this, for example, it is possible to supply the hydraulic fluid from the accumulator 25 to the rear side chamber 13g to pressurize the hydraulic fluid of the head side chamber 13h by the boosting piston 17.

The fourth flow path 27D connects the rod side chamber 13r and the tank 21. Due to this, for example, the hydraulic fluid which is discharged from the rod side chamber 13r along with the advance of the injection piston 15 can be stored in the tank 21.

The fifth flow path 27E connects the front side chamber 13f and the tank 21. Due to this, for example, the front side chamber 13f is depressurized and the boosting action by the boosting piston 17 can be obtained.

Note that, in FIG. 1, representative flow paths provided in the hydraulic pressure device 9 are exemplified. In actuality, the hydraulic pressure device 9 has other not shown flow paths. For example, the hydraulic pressure device 9 has a flow path for supplying the hydraulic fluid from the pump 23 to the rod side chamber 13r in order to make the injection piston 15 retract.

The shown and not shown plurality of flow paths are for example configured by steel pipes, flexible hoses, or metal blocks. Parts of the plurality of flow paths may be suitably shared. For example, in the example in FIG. 1, among the first flow path 27A to third flow path 27C, the portion on the accumulator 25 side is shared, and between the fourth flow path 27D and the fifth flow path 27E, the portion on the tank 21 side is shared.

The first valve 29A is provided in the first flow path 27A and for example contributes to permission and prohibition of supply of the hydraulic fluid from the pump 23 to the accumulator 25 and to permission and prohibition of discharge of the hydraulic fluid from the accumulator 25 to the tank 21. The first valve 29A is for example configured by a direction control valve and more specifically configured by for example a 4-port 3-position switching valve which is driven by a spring and electromagnet. The first valve 29A for example prohibits the flow between the accumulator 25 and the tank 21 and pump 23 at one position (for example neutral position), permits the flow from the pump 23 to the accumulator 25 and prohibits the flow from the accumulator 25 to the tank 21 at another position, and prohibits the flow from the pump 23 to the accumulator 25 and permits the flow from the accumulator 25 to the tank 21 at still another position.

The second valve 29B is provided in the second flow path 27B and for example contributes to prevention of backward flow of the hydraulic fluid from the head side chamber 13h to the accumulator 25. The second valve 29B is for example configured by a pilot type check valve, permits the flow of the hydraulic fluid from the accumulator 25 to the head side chamber 13h and prohibits the flow in the opposite direction to that at the time when the pilot pressure is not introduced and permits the flow of the two when the pilot pressure is introduced. The introduction of the pilot pressure to the second valve 29B is controlled by for example the sixth valve 29F.

The third valve 29C is provided in the third flow path 27C and for example contributes to permission and prohibition of discharge of the hydraulic fluid from the accumulator 25 to the rear side chamber 13g. The third valve 29C is for example configured by a logic valve, is closed when the pilot pressure is introduced, and is opened when the pilot pressure is not introduced. The introduction of the pilot pressure to the third valve 29C is for example controlled by the seventh valve 29G.

Note that, FIG. 1 illustrates representative valves provided in the hydraulic pressure device 9. In actuality, the hydraulic pressure device 9 has another not shown valve. For example, the hydraulic pressure device 9 has a valve which permits or prohibits discharge of the hydraulic fluid from the accumulator 25 to the head side chamber 13h (note, this can be handled by changing the configuration of the second valve 29B as well). Further, a servo valve which controls the flow rate of the hydraulic fluid from the accumulator 25 etc. to the head side chamber 13h (configures a meter-in circuit) and/or a servo valve which controls the flow rate of the hydraulic fluid discharged from the rod side chamber 13r to the tank 21 etc. (configures a meter-out circuit) may be provided as well.

The control device 11 for example includes, although not particularly shown, a CPU, ROM, RAM, and external memory etc. The control device 11 outputs control signals (control commands) for controlling each of portions based on the input signals according to a program which is stored in advance. Note that, the control device 11 may be configured as a control device of the injection device 1 or may be configured as a control device of the die casting machine DC1 which controls not only the operation of the injection device 1, but also the operation of a not shown clamping device and not shown ejection device.

Signals are input to the control device 11 by for example an input device 35 accepting an input operation by a user, a pressure sensor 37 for detecting the pressure (gas pressure) of the gas chamber 31b in the accumulator 25, and a not shown position sensor for detecting the position of the plunger 5 (piston rod 19). Signals are output from the control device 11 to for example a display device 39 for displaying information to the user, a not shown electric motor (strictly a driver thereof) for driving the pump 23, and various types of valves (for example first valve 29A, sixth valve 29F, and seventh valve 29G).

The input device 35 and display device 39 may be given suitable configurations, Part or all of them may be integrally configured as well. For example, the input device 35 and display device 39 may be configured including a touch panel and mechanical switches. The pressure sensor 37 may be an electrostatic capacity type, vibration type, or other suitable type.

(Outline of Basic Operation of Injection Apparatus)

An example of the basic operation of the injection device 1 having the above configuration will be explained in brief below.

(Low Speed Injection)

First, when the clamping operation of the fixed mold 103 and moving mold 105 is completed by the not shown clamping device and molten metal is supplied to the sleeve 3, the control device 11 advances the plunger 5 at a relatively low speed. Due to this, the molten metal in the sleeve 3 is ejected toward the cavity 107 while suppressing air entrainment by the molten metal.

Specifically, the control device 11 controls the hydraulic pressure device 9 so that, for example, the hydraulic fluid is supplied from the pump 23 to the head side chamber 13h or the hydraulic fluid is supplied from the accumulator 25 to the head side chamber 13h. The hydraulic fluid in the rod side chamber 13r is for example discharged to the tank 21 or is refluxed to the head side chamber 13h. The speed of the plunger 5 is for example controlled according to the speed control of the pump 23, meter-in circuit, and/or meter-out circuit.

(High Speed Injection)

When it is detected by a not shown position sensor that the plunger 5 has reached a predetermined high speed switching position, the control device 11 advances the plunger 5 at a relatively high speed. Due to this, for example, the molten metal is smoothly filled in the cavity 107 before solidification of the molten metal.

Specifically, for example, when the hydraulic fluid was not supplied from the accumulator 25 to the head side chamber 13h at the low speed injection, the control device 11 opens the not shown valve and permits the supply of the hydraulic fluid from the accumulator 25 to the head side chamber 13h. Further, for example, when the hydraulic fluid was already supplied from the accumulator 25 to the head side chamber 13h at the low speed injection, it makes the degree of opening of the not shown valve configuring the meter-in circuit and/or meter-out circuit larger. The hydraulic fluid in the rod side chamber 13r is for example discharged to the tank 21 or refluxed to the head side chamber 13h. The speed of the plunger 5 is for example controlled according to the meter-in circuit and/or meter-out circuit.

(Deceleration, Boosting, and Pressure Retention)

When the molten metal is filled in the cavity 107 as a result of the high speed injection, the plunger 5 receives a counterforce from the molten metal and decelerates. The deceleration control may be executed by the meter-in circuit and/or meter-out circuit as well.

At roughly the same time as the deceleration, the control device 11 opens the third valve 29C. Due to this, the hydraulic fluid is supplied from the accumulator 25 to the rear side chamber 13g, and a boosting action by the boosting piston 17 is caused. As a result, the pressure of the molten metal in the cavity 107 rises. The rod side chamber 13r and front side chamber 13f are for example permitted to discharge the hydraulic fluid to the tank 21. Then, the pressure of the molten metal converges to the constant magnitude (final pressure, casting pressure in narrow sense). From another viewpoint, the force received at the plunger 5 from the molten metal and the force which is given by the accumulator 25 to the plunger 5 through the hydraulic fluid are balanced.

After that, pressure is continuously given from the accumulator 25 to the rear side chamber 13g, whereby the pressure of the molten metal is held constant. That is, the pressure is retained. Note that, in reality, the pressure changes due to leakage etc. of the hydraulic fluid at various portions, but the magnitude thereof is very small. This change will be sometimes ignored in the explanation of the present embodiment.

After that, when the molten metal solidifies, the not shown clamping device opens the mold, a not shown ejection device ejects the die casting from the mold, the plunger 5 is retracted by supplying the hydraulic fluid to the rod side chamber 13r, and so on. Further, in preparation for the next molding cycle, hydraulic fluid is supplied from the pump 23 through the first valve 29A to the liquid chamber 31a in the accumulator 25, and pressure is accumulated in the accumulator 25.

(Interrelationship of Pressures of Various Portions in Injection Apparatus)

As understood from the explanation of the example of the basic operation explained above, the final pressure is determined according to the pressure of the accumulator 25. As already explained, conventionally, a suitable final pressure is obtained by filling or discharging gas in the gas chamber 31b of the accumulator 25 at the time of commencement of operation of the die casting machine DC1 (before the commencement of the plurality of molding cycles). Contrary to this, in the present embodiment, the desired final pressure is obtained by accumulating the pressure in the accumulator 25 up to a suitable pressure before injection in each molding cycle. The principle is predicated on the interrelationship of pressures of the various portions in the injection device 1 as explained below.

Figure 2:
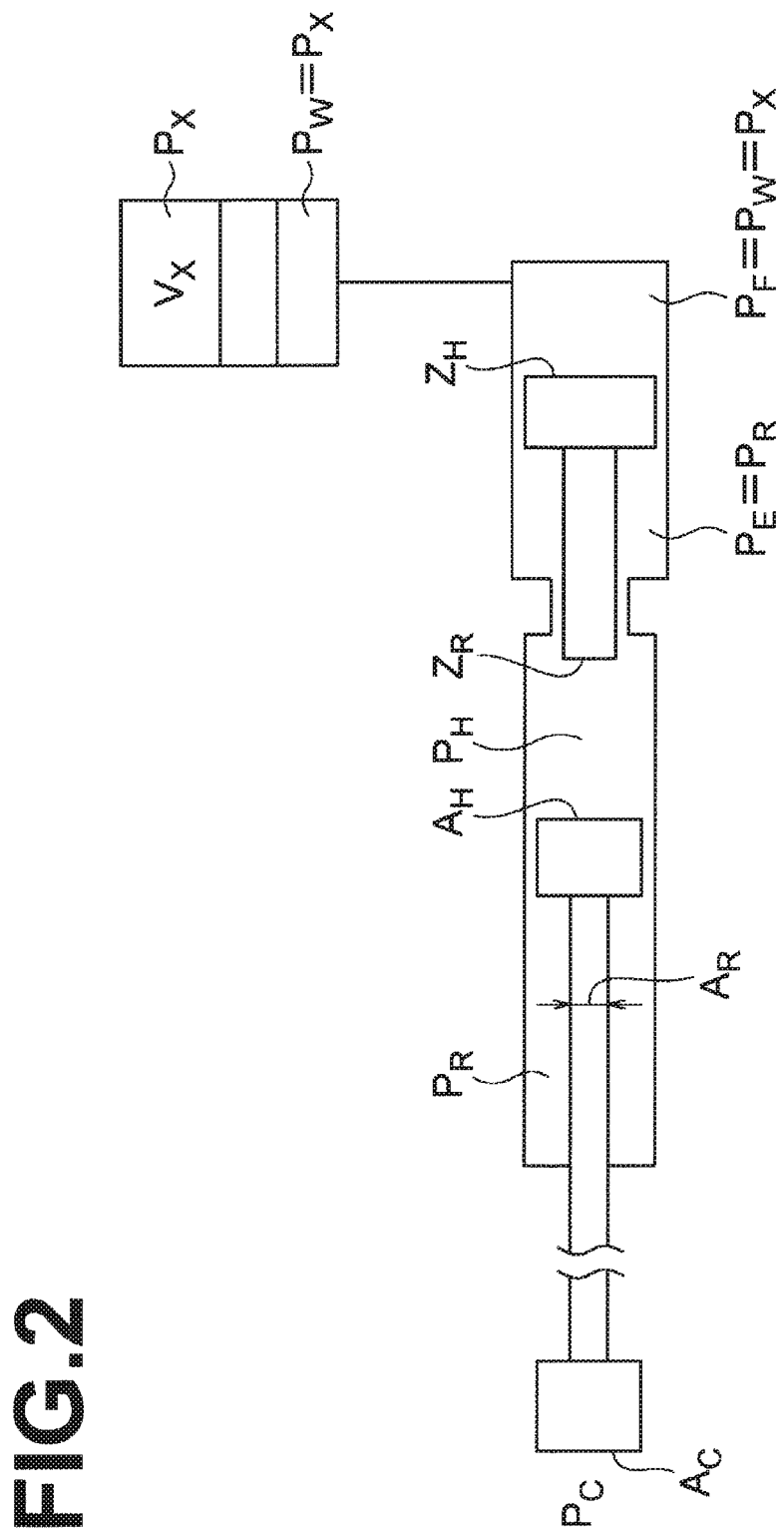
FIG. 2 A schematic view showing the definition of notations relating to the pressure and area in the injection device in FIG. 1.

FIG. 2 shows the definitions of notations which are necessary for the explanation of the interrelationship of pressures of the various parts. Specifically, they are as follows.

$P_C$: Casting pressure (pressure of molten metal. Sometimes indicates the final pressure).

$A_C$: Area by which the plunger 5 receives pressure from molten metal $P_R$: Pressure of rod side chamber 13r $A_R$: Cross-sectional area of piston rod 19

$P_H$: Pressure of head side chamber 13h $A_H$: Cross-sectional area of injection piston 15 (area by which injection piston 15 receives pressure from hydraulic fluid in head side chamber 13h)

$Z_R$: Cross-sectional area of small diameter piston portion 17a (area by which boosting piston 17 receives pressure from hydraulic fluid of head side chamber 13h)

$P_E$: Pressure of front side chamber 13f $Z_H$: Cross-sectional area of large diameter piston portion 17b (area by which boosting piston 17 receives pressure from hydraulic fluid in rear side chamber 13g)

$P_F$: Pressure of rear side chamber 13g $P_W$: Pressure of liquid chamber 31a $P_X$: Pressure of gas chamber 31b $V_X$: Volume of gas chamber 31b Since the rear side chamber 13g and the liquid chamber 31a are connected, it can be deemed that $P_F=P_W$. Further, for the piston 33 in the accumulator 25, for example, the pressurized area in the liquid chamber 31a and the pressurized area in the gas chamber 31b are equal, therefore it can be deemed that $P_W=P_X$. Consequently, it can be deemed that $P_F=P_X$.

Further, when the molten metal reaches the final pressure, for example, since the rod side chamber 13r and front side chamber 13f are connected to the tank 21, it can be deemed that $P_R=0$ and $P_E=0$.

When the molten metal reaches the final pressure, the forces applied to the plunger 5 are balanced, therefore the following equation stands.

$$P_C \times A_C = P_H \times A_H \quad (1)$$

In the same way, when the molten metal reaches the final pressure, the forces applied to the boosting piston 17 are balanced, therefore the following equation stands.

$$P_H \times Z_R = P_X \times Z_H \quad (2)$$

When eliminating $P_H$ in Equation (1) and Equation (2) by entering one equation into the other equation to modify it, Equation (3) converting the pressure $P_X$ of the gas chamber 31b to the casting pressure $P_C$ and, conversely, Equation (4) converting the casting pressure $P_C$ to the pressure $P_X$ of the gas chamber 31b are obtained.

$$P_C = P_X \times (Z_H \times A_H)(Z_R \times A_C) \quad (3)$$

$$P_X = P_C \times (Z_R \times A_C)(Z_H \times A_H) \quad (4)$$

Here, $A_C$, $A_H$, $Z_R$, and $Z_H$ are determined according to the configuration of the injection device 1 and are fixed values. Accordingly, according to Equation (3), it is understood that the casting pressure $P_C$ is determined according to the pressure $P_X$ of the gas chamber 31b in the accumulator 25. From the reverse viewpoint, the required pressure $P_X$ which is necessary for the gas chamber 31b at the time when the final pressure is reached can be found based on the casting pressure $P_C$ which is necessary for obtaining the desired quality.

Figure 3A:
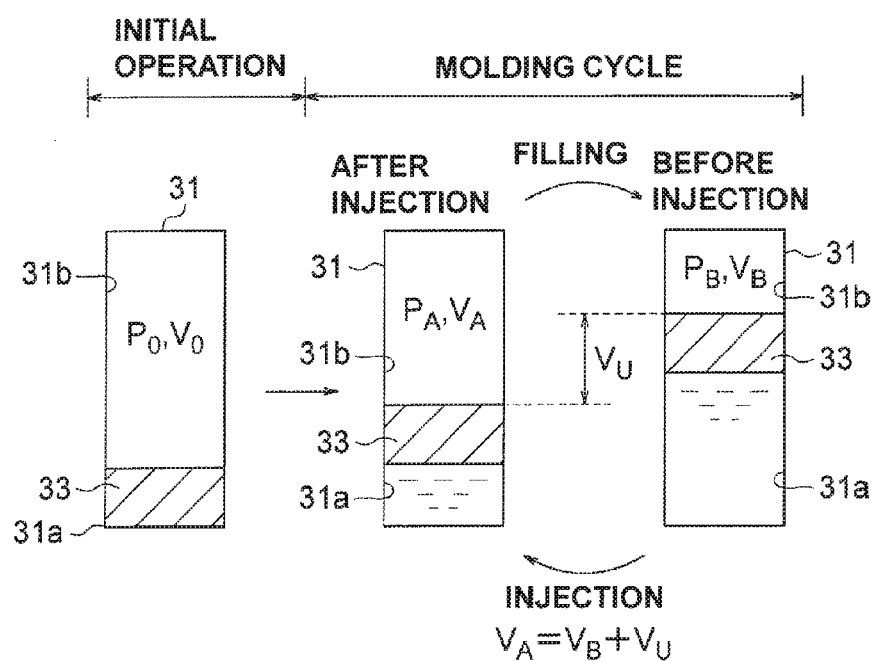
FIG. 3A to FIG. 3C are schematic views showing the definition of notations relating to the pressure and volume of the accumulator.

FIG. 3A is a schematic view showing changes of the pressure $P_X$ and volume of the gas chamber 31b.

The diagram on the left side of the drawing in FIG. 3A shows a state where the piston 33 is positioned at the movement limit on the liquid chamber 31a side. That is, it shows a state where all hydraulic fluid is discharged (strictly there is a little hydraulic fluid). The pressure $P_X$ and volume $V_X$ of the gas chamber 31b in this state will be defined as $P_0$ and $V_0$.

The diagram at the center of the drawing in FIG. 3A shows a state after injection ("injection" referred to here is injection in a broad sense including boosting. Same below unless otherwise indicated), that is, a state where the casting pressure $P_C$ reaches the final pressure. Note that, in the present embodiment, in this state, the piston 33 has not reached the movement limit on the liquid chamber 31a side. The pressure $P_X$ and volume $V_X$ of the gas chamber 31b in this state will be defined as $P_A$ and $V_A$.

The diagram on the right side of the drawing in FIG. 3A shows a state before injection (before low speed injection). Note that, naturally, in this state, the volume of the liquid chamber 31a is larger and the volume of the gas chamber 31b is smaller than those in the state after injection. The pressure $P_X$ and volume $V_X$ of the gas chamber 31b in this state will be defined as $P_B$ and $V_B$.

As shown by the diagram at the center of the drawing and the diagram on the right side of the drawing in FIG. 3A, when the hydraulic fluid is discharged from the accumulator 25 at the time of injection, the volume of the gas chamber 31b increases by a volume corresponding to the amount of that discharged hydraulic fluid. The amount of increase of the volume (volume of the discharged hydraulic fluid) will be defined as $V_U$ (=$V_A$−$V_B$).

The volume $V_0$ is a fixed value determined according to the configuration of the accumulator 25. The pressure $P_0$ is determined according to the volume $V_0$ and the amount of the gas filled in the gas chamber 31b. That is, in the molding cycle, if ignoring the leakage etc. of the gas from the gas chamber 31b, the pressure $P_0$ is a fixed value.

The product of the pressure $P_X$ and the volume $V_X$ of the gas chamber 31b can be regarded as roughly constant before and after the movement of the piston 33. Accordingly, the following equation stands for the pressure $P_X$ and the volume $V_X$ at the time when the piston 33 is positioned at any position:

$$P_X \times V_X = P_0 \times V_0 \quad (5)$$

The pressure $P_A$ after the injection is the pressure when the final pressure is obtained. Therefore, according to Equation (4), this is represented by the following equation by defining the $P_C$ as the final pressure:

$$P_A = P_C \times (Z_R \times A_C)/(Z_H \times A_H) \quad (6)$$

Further, the volume $V_A$ after the injection is represented by the following equation according to Equation (5):

$$V_A = V_0 \times P_0/P_A \quad (7)$$

The pressure $P_B$ before the injection is represented by the following equation according to Equation (5):

$$P_B = P_A \times V_A/V_B \quad (8)$$

Further, the volume $V_B$ before injection is represented by the following equation as already explained:

$$V_B = V_A - V_U \quad (9)$$

The volume $V_U$ mainly corresponds to the amounts of the hydraulic fluid which is supplied to the head side chamber 13h at the times of low speed injection and high speed injection and the amount of the hydraulic fluid which is supplied to the rear side chamber 13g at the time of boosting and is for example determined according to the amount of the molten metal supplied to the sleeve 3, the boosting start timing, and so on. The volume $V_U$ is ideally a fixed value for a molding cycle which is repeated with respect to one mold 101. For the volume $V_U$, for example, if the target value etc. of the biscuit thickness is calculated or set, an estimated value can be found from the product of the stroke of the injection piston 15 at the time of injection and the cross-sectional area $A_H$ of the injection piston 15.

In Equation (6), $Z_R$, $A_C$, $Z_H$, and $A_H$ are fixed values, so the pressure $P_A$ after injection can be calculated based on the desired casting pressure (final pressure) $P_C$. In Equation (7), $V_0$ and $P_0$ are fixed values as already explained and the pressure $P_A$ can be calculated according to Equation (6). Therefore, in the final analysis, the volume $V_A$ can be calculated based on the desired casting pressure $P_C$. In Equation (9), the volume $V_A$ can be calculated according to Equation (7), and the estimated value can be calculated as the volume $V_U$. Therefore, in the final analysis, the volume $V_B$ can be calculated based on the desired casting pressure $P_C$. Accordingly, in Equation (8), the pressure $P_A$, volume $V_A$, and volume $V_B$ can be calculated based on the desired casting pressure $P_C$, and consequently the pressure $P_B$ before injection can be calculated based on the desired casting pressure $P_C$.

Therefore, the control device 11 receives the target value of the casting pressure $P_C$ (final pressure) from the input device 35 and calculates the pressure $P_B$ before injection based on that input target value of the casting pressure. Then, before the injection, hydraulic fluid is supplied from the pump 23 to the accumulator 25 until the pressure of the gas chamber 31b reaches the pressure $P_B$ before injection. Due to this, the desired casting pressure can be obtained even if not filling and/or discharging the gas with respect to the gas chamber 31b in the accumulator 25.

The control device 11, for example, may calculate the pressure $P_B$ before the injection (target value thereof) by performing computations of Equation (6), Equation (7), Equation (9), and Equation (8) in order or may calculate the pressure $P_B$ before the injection by computing one equation which is derived from Equation (6), Equation (7), Equation (9), and Equation (8). Note that, in the explanation of the present embodiment, sometimes the two will not be particularly differentiated. For other equations, sometimes the computation of one equation and computations of a plurality of equations which are substantially the same as the computation of the former equation will not be particularly differentiated.

Figure 3B:
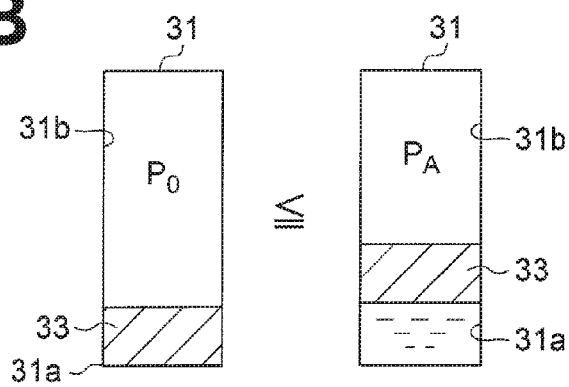

FIG. 3B is a schematic view for explaining the lower limit value of the casting pressure (final pressure) $P_C$.

The lower limit value of the pressure $P_X$ of the gas chamber 31b is the pressure $P_0$ at the time when the piston 33 is positioned at the movement limit on the liquid chamber 31a side. On the other hand, the minimum value of the pressure $P_X$ in the molding cycle is the pressure $P_A$ after the injection. Accordingly, the pressure $P_A$ after the injection must be the pressure $P_0$ or more. From this condition, the lower limit value $P_{Cmin}$ of the casting pressure $P_C$ is defined.

Specifically, in Equation (3), by setting $P_X = P_A \geq P_0$, the following equations are obtained.

$$P_C \geq P_{Cmin}$$

$$P_{Cmin} = P_0 \times (Z_H \times A_H)/(Z_R \times A_C) \quad (10)$$

By showing this pressure $P_{Cmin}$ to the worker and/or checking whether the target value of the casting pressure $P_C$ which is set by the worker is $P_{Cmin}$ or more, the target value of the casting pressure $P_C$ can be suitably set.

Figure 3C:
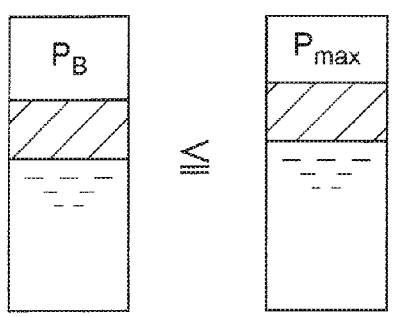

FIG. 3C is a schematic view for explaining the upper limit value of the casting pressure (final pressure) $P_C$.

The upper limit value $P_{max}$ of the pressure $P_X$ of the gas chamber 31b is for example set by the manufacturer etc. of the accumulator 25 based on the structure of the accumulator 25. Note that, this upper limit value $P_{max}$ can be grasped from for example the information printed on the accumulator 25 or a pamphlet, specifications, or instructions of the accumulator 25. On the other hand, the maximum value of the pressure $P_{max}$ in the molding cycle is the pressure $P_B$ before the injection. Accordingly, the pressure $P_B$ after the injection must be the pressure $P_{max}$ or less. The upper limit value $P_{Cmax}$ of the casting pressure $P_C$ is defined from this condition.

Specifically, first, the following equation stands according to Equation (5):

$$V_B = V_0 \times P_0/P_B \quad (11)$$

Further, as equations of the inverse calculations of Equation (9) and Equation (8), the following equations stand.

$$V_A = V_B + V_U \quad (12)$$

$$P_A = P_B \times V_B/V_A \quad (13)$$

In Equation (11), $V_0$ and $P_0$ are fixed values. Therefore, if $P_B = P_{max}$, the volume $V_B$ (below, sometimes referred to as the volume $V_{min}$) at the upper limit value $P_{max}$ can be calculated. In Equation (12), the estimated value is obtained for $V_U$, and $V_B$ is obtained by Equation (11) as $V_{min}$. Therefore, in the final analysis, the volume $V_A$ after the injection which corresponds to the pressure $P_{max}$ can be calculated based on the pressure $P_{max}$. In Equation (13), if the pressure $P_B$, volume $V_B$, and volume $V_A$ are set to be the pressure $P_{max}$, volume $V_{min}$, and the volume $V_A$ which corresponds to the pressure $P_{max}$, the pressure $P_A$ corresponding to the pressure $P_{max}$ can be calculated. Further, if the pressure $P_A$ corresponding to the pressure $P_{max}$ is used as the pressure $P_X$ in Equation (3), the upper limit value $P_{Cmax}$ of the casting pressure $P_C$ can be found.

The control device 11 for example may calculate the upper limit value $P_{Cmax}$ by performing the computations of Equation (11), Equation (12), Equation (13), and Equation (3) in order or calculate the upper limit value $P_{Cmax}$ by computing one equation which is derived from Equation (11), Equation (12), Equation (13), and Equation (3). Note that, for example, when showing the upper limit value $P_{Cmax}$ according to the pressure $P_{max}$ and volume $V_{min}$, this becomes as follows:

$$P_C \leq P_{Cmax}$$

$$P_{Cmax} = P_{max} \times V_{min} / (V_{min} + V_U) \times (Z_H \times A_H) / (Z_R \times A_C) \quad (14)$$

In the same way as $P_{Cmin}$, by showing the pressure $P_{Cmax}$ to the worker and/or checking whether the target value of the casting pressure $P_C$ which is set by the worker is $P_{Cmax}$ or less, the target value of the casting pressure $P_C$ can be suitably set.

As shown in FIG. 3A, the injection device 1 performs the initial operation and then repeats the molding cycle. In the initial operation, for example, the processing for acquiring the pressures $P_0$ and $P_B$ is carried out. In the molding cycle, the accumulator 25 is filled based on the pressure $P_B$ acquired in the initial operation.

Figure 4:
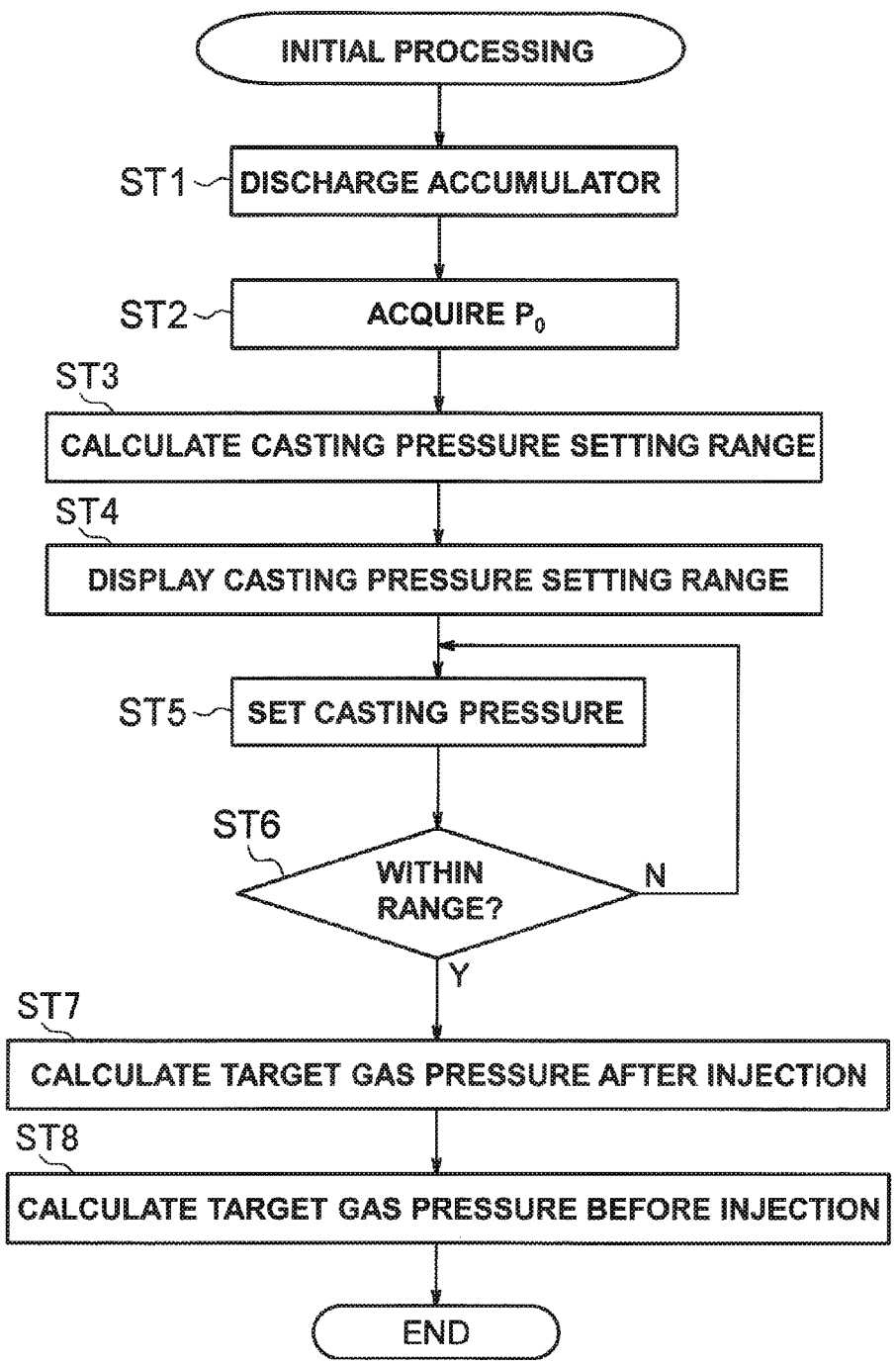
FIG. 4 A flow chart showing an example of a procedure of an initial processing which is executed by the injection device in FIG. 1.

FIG. 4 is a flow chart showing an example of the procedure of the initial processing which is executed by the injection device 1 (control device 11) in the initial operation. This processing is commenced by for example the worker performing a predetermined operation for setting the molding conditions with respect to the input device 35.

At step ST1, the control device 11 connects the liquid chamber 31a and the tank 21 by the first valve 29A and performs full discharge of the hydraulic fluid in the accumulator 25. Due to this, the accumulator 25, as shown on the left side in the drawing in FIG. 3A, is rendered a state where the piston 33 is positioned at the movement limit on the liquid chamber 31a side.

At step ST2, the control device 11 acquires the detection value of the pressure sensor 37 and holds this as the pressure $P_0$. Note that, the control device 11 for example judges whether the full discharge of the accumulator 25 is completed and acquires the pressure $P_0$ when judging the completion. Note, the worker may judge the completion of full discharge of the accumulator 25 and instruct the control device 11 to acquire the pressure $P_0$ through the input device 35 as well. The completion of full discharge of the accumulator 25 may be judged by for example the pressure detected by the pressure sensor 37 converging to a constant value and/or by a predetermined time passing after the commencement of discharge of the accumulator 25.

Note that, the gas of the gas chamber 31b may be discharged and/or filled as well between step ST1 and step ST2. Note, adjustment of the amount of such filling of the gas is not essential in the present embodiment.

At step ST3, the control device 11 enters the pressure $P_0$ acquired at step ST2 and the areas $Z_H$, $A_H$, $Z_R$, and $A_C$ which are held in advance into Equation (10) to calculate the lower limit value $P_{Cmin}$ of the casting pressure. Further, the control device 11 enters the pressure $P_0$ acquired at step ST2 and the pressure $P_{max}$, volumes $V_0$ and $V_U$, and the areas $Z_H$, $A_H$, $Z_R$, and $A_C$ which are held in advance into Equations (11) to (13) and Equation (3) to calculate the upper limit value $P_{Cmax}$ of the casting pressure. That is, it calculates the range where the casting pressure can be set.

Note that, the value which is held in advance by the control device 11 may be input by the manufacturer of the injection device 1 or may be input by a worker of the injection device 1. This same is true for other values which will be explained later as well. The amount of change of the volume of the gas chamber 31b before and after the injection, that is, the volume $V_U$, may be input by a worker or may be calculated by the control device 11 based on the various molding conditions (for example biscuit thickness) input through the input device 35 to the control device 11, before step ST3 in this initial processing.

At step ST4, the control device 11 makes the display device 39 display the range calculated at step ST3 where the casting pressure can be set.

At step ST5, the control device 11 receives the setting of the target value of the casting pressure by a worker through the input device 35.

At step ST6, the control device 11 judges whether the target value of the casting pressure set at step ST5 is within the range calculated at step ST3. Further, the control device 11 proceeds to step ST7 when judging this is within the above range, while returns to step ST5, makes the display device 39 display that the target value of casting pressure is not suitable, and receives the setting of the target value of casting pressure again when judging this is not within the above range.

At step ST7, the control device 11 enters the target value of the casting pressure set at step ST5 and the areas $Z_R$, $A_C$, $Z_H$, and $A_H$ which are held in advance into Equation (6) to calculates the pressure $P_A$ (target value) after the injection.

At step ST8, the control device 11 enters the pressure $P_A$ after injection which is calculated at step ST7, the pressure $P_0$ which is acquired at step ST2, and the volumes $V_U$ and $V_0$ which are held in advance into Equation (7), Equation (9), and Equation (8) to calculate the pressure $P_B$ (target value) before the injection. Note that, as already explained, the pressure $P_B$ before injection may be calculated by entering the target value of casting pressure which is set at step ST5 into a numerical formula combining the above into one in advance.

Figure 5:
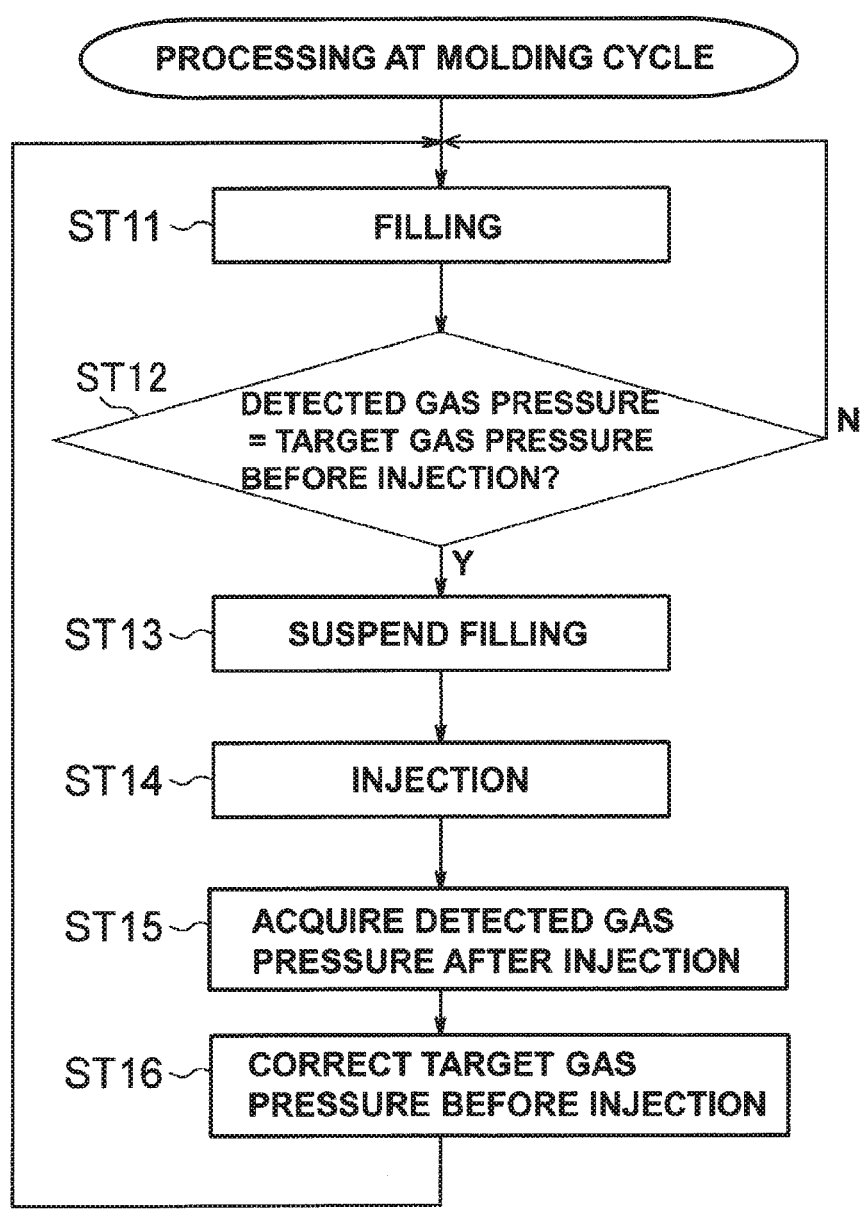
FIG. 5 A flow chart showing an example of the procedure of a processing at the time of a molding cycle which is executed by the injection device in FIG. 1.

FIG. 5 is a flow chart showing an example of the procedure of the processing performed at the time of a molding cycle and executed by the injection device 1 (control device 11) in that molding cycle. This processing is commenced by for example a worker performing a predetermined operation for starting the molding cycle at the input device 35.

At step ST11, the control device 11 connects the pump 23 and the liquid chamber 31a by the first valve 29A. Due to this, hydraulic fluid is filled in the liquid chamber 31a from the pump 23, and pressure is accumulated at the accumulator 25. Note that, the pump 23, as already explained, may be driven over a plurality of cycles or may be driven only at the time required in this way.

At step ST12, the control device 11 judges whether the gas pressure detected by the pressure sensor 37 reaches the pressure $P_B$ (target value) before the injection which is calculated at step ST8. Further, when judging that it has not yet reached it, the control device 11 returns to step ST11 where it continues filling the hydraulic fluid. Further, when judging that it has reached it, the control device 11 sets the first valve 29A to the neutral position and prohibits both filling and discharge of the hydraulic fluid in the accumulator 25 (step ST13).

Note that, in the present embodiment, the pressure of the gas chamber 31b is directly detected by the pressure sensor 37 and the pressure accumulation of the accumulator 25 is suspended by the control valve (first valve 29A), therefore it may be regarded that the target value of the pressure $P_B$ and the actual value roughly coincide. In the following description, sometimes the two will not be differentiated.

At step ST14, the control device 11, as already explained, performs low speed injection, high speed injection, boosting, pressure retention, and so on.

At step ST15, the control device 11 acquires the detection value of the pressure sensor 37 as the measured value of the pressure $P_A$ after the injection. Note that, FIG. 5 is, for convenience, drawn as if step ST15 were executed after the completion of step ST14, but the measured value of the pressure $P_A$ may be acquired at the time when the pressure $P_C$ of the molten metal reaches the final pressure or the pressure is being retained or the like.

Whether the pressure $P_C$ of the molten metal reaches the final pressure may be judged according to for example whether the pressure $P_C$ of the molten metal has converged to a (roughly) constant value. The pressure $P_C$ of the molten metal may be detected (indirectly) by a not shown pressure sensor which detects the pressure of the head side chamber 13h, the detection value of the not shown pressure sensor for detecting the pressure of the rod side chamber 13r may be considered in addition to this, or the pressure of the molten metal may be detected by the not shown pressure sensor which directly detects it.

At step ST16, the target value of the pressure $P_B$ before the injection is set (corrected) based on the measured value of the pressure $P_A$ after the injection which is acquired at step ST15. For example, first, the difference $\Delta P_A$ between the target value of the pressure $P_A$ calculated at step ST7 and the measured value of the pressure $P_A$ acquired at step ST15 (=target value−measured value) is calculated. Next, the target value of pressure $P_A$+difference $\Delta P_A$ is set as a new target value of the pressure $P_A$ and this value is entered into Equations (7), (9), and (8) to calculate a new target value of the pressure $P_B$ before the injection. The new target value of the pressure $P_B$ is used at step ST12 of the next molding cycle.

By performing such correction, for example, the deviation of the measured value of the pressure $P_A$ after injection from the target value which is caused by leakage etc. of hydraulic fluid, is corrected, therefore a desired casting pressure $P_C$ can be obtained more suitably. Further, for example, even if the estimated value is input for the volume $V_U$ etc. in the first stage of commencement of the molding cycle, the desired casting pressure can be obtained by repeating the molding cycle.

Note that, it may be judged whether the difference $\Delta P_A$ is within the predetermined permissible range, and the target value of the pressure $P_B$ before injection may be corrected only at the time when judging that the difference is not within the permissible range. Further, the target value of the pressure $P_B$ before injection may be corrected based on the mean value of the difference $\Delta P_A$ in the plurality of molding cycles up to the present molding cycle as well.

Further, instead of using the difference $\Delta P_A$, a drop ratio $D_P$ of the pressure of the gas chamber 31b before and after the injection may be found and this drop ratio $D_P$ may be used to correct the target value of the pressure $P_B$ before injection. Note that, the drop ratio is represented by the following equation:

$$D_P=(P_B-P_A)/P_B \qquad (15)$$

After that, the control device 11 returns to step ST11. That is, the next molding cycle is carried out.

As described above, in the present embodiment, the injection device 1 has the injection cylinder 7 for driving the plunger 5, the gas pressure type accumulator 25 which supplies the hydraulic fluid to the injection cylinder 7, the hydraulic fluid supply device 26 (combination of the pump 23 and the first valve 29A) which supplies the hydraulic fluid to the accumulator 25, the pressure sensor 37 for detecting the gas pressure of the accumulator 25, and the control device 11 which controls the hydraulic fluid supply device 26 so as to suspend the supply of the hydraulic fluid when the detection value of the pressure sensor 37 reaches the predetermined target gas pressure before injection (target value of pressure $P_B$) in the state where the hydraulic fluid is supplied from the hydraulic fluid supply device 26 to the accumulator 25 in the molding cycle.

Accordingly, in the molding cycle, the pressure of the gas chamber 31b can be directly detected and the pressure of the gas chamber 31b can be controlled to one in accordance with the target value of the casting pressure $P_C$. As a result, for example, even when the target value of the casting pressure $P_C$ changes, it is not necessary to discharge or fill the accumulator. That is, the load of the worker is lightened and reduced. Note that, Patent Literature 1 discloses a pressure sensor which detects the pressure of the gas chamber, but such a pressure sensor is generally used in discharging and filling gas, and is not used for pressure accumulation by supply of hydraulic fluid in the molding cycle. In general, the state of pressure accumulation of the accumulator in the molding cycle is judged by detecting the pressure of the hydraulic fluid.

Further, in the present embodiment, the control device 11 further has the input device 35 which receives the input of the target value of the casting pressure (final pressure) $P_C$. The accumulator 25 has the piston 33 for separating the hydraulic fluid and the gas. The control device 11 sets the target gas pressure before injection (target value of pressure $P_B$) based on the target value of the casting pressure $P_C$ (step ST8). From another viewpoint, in the injection device 1, the pressure $P_B$ of the gas before injection of the accumulator 25 changes in accordance with the target value of the casting pressure $P_C$ which is input.

Accordingly, compared with an embodiment where the worker himself computes the target value of the pressure $P_B$ in accordance with the casting pressure $P_C$ (this embodiment is also included in the invention of the present application), the load of the worker is lightened and reduced. The accumulator 25 is a cylinder type. Therefore, compared with an embodiment where it is a bladder type (this embodiment is also included in the invention of the present application), the procedure of computation of the control device 11 is clear, and application to an accumulator 25 which is different in concrete configuration (dimensions, strength, etc.) is easy.

Further, in the present embodiment, the control device 11 calculates the pressure $P_B$ of the target pressure before injection by entering the target value of the final pressure input through the input device 35 for the pressure $P_C$ in the numerical formula (combination of Equations (6) to (9)— also may be combined into a single equation) in which the pressure $P_X$ obtained by a numerical formula (Equation (4)) converting the pressure $P_C$ received at the plunger 5 from the molten metal to the pressure $P_X$ of the gas in the accumulator 25 is entered for the pressure $P_A$ of the gas chamber 31b in the numerical formulas (Equation (7), Equation (9), and Equation (8)) for calculating the pressure $P_B$ of the gas chamber 31b when supplying hydraulic fluid of the volume $V_U$ to the accumulator 25 having the pressure $P_A$.

Accordingly, the target value of the pressure $P_B$ of the gas chamber 31b before the injection of the accumulator 25 is easily and simply calculated from the desired casting pressure $P_C$. The values of the variables used in this computation are substantially fixed values in the present embodiment other than the value of the desired casting pressure $P_C$. Accordingly, the load of the worker is lightened and reduced.

Further, in the present embodiment, the control device 11 enters the target value of the final pressure which is input through the input device 35 for the pressure $P_C$ in the numerical formula (Equation (4)) converting the pressure $P_C$ received at the plunger 5 from the molten metal to the pressure $P_X$ of the gas in the accumulator 25, to calculate the pressure $P_X$ as the target gas pressure after injection (target value of the pressure $P_A$), and sets the target gas pressure before injection of the next molding cycle based on that calculated target gas pressure after injection and the detection value of the pressure sensor 37 after injection (measured value of the pressure $P_A$) (step ST16).

Accordingly, as already explained, the pressure of the accumulator 25 is suitably adjusted corresponding to a change due to the leakage etc. of hydraulic fluid and/or the desired casting pressure can be obtained while absorbing deviation of various values in the initial setting.

Further, in the present embodiment, the control device 11 enters the detection value (pressure $P_0$) of the pressure sensor 37 in the state where the hydraulic fluid is fully discharged from the accumulator 25 for the pressure $P_X$ in the numerical formula (Equation (3)) converting the pressure $P_X$ of the gas in the accumulator 25 to the pressure $P_C$ received at the plunger 5 from the molten metal, to calculate the pressure $P_C$ as the minimum final pressure (minimum casting pressure $P_{Cmin}$) (step ST3), and judges whether the target value of the final pressure (casting pressure $P_C$) received by the input device 35 is the minimum final pressure or more (step ST6).

Accordingly, for example, when the target value of the casting pressure $P_C$ which is receiver is smaller than the minimum casting pressure $P_{Cmin}$, this fact is informed to the worker by the control device 11 and/or the molding cycle is started only at the time when the target value of the casting pressure $P_C$ which is received is the minimum casting pressure $P_{Cmin}$ or more. Due to this, the load of the worker is lightened and reduced. Further, the chance of production of inferior goods is reduced.

Further, in the present embodiment, the control device 11 enters the value input from the input device 35 or the constant value which is held by the control device ($P_{max}$) for the pressure $P_B$ in the numerical formula (combination of Equation (11), Equation (12), Equation (13), and Equation (3)—may also be combined to a single equation) in which the pressure $P_A$ obtained by numerical formula (Equation (11), Equation (12), and Equation (13)) calculating the pressure $P_A$ based on the pressure $P_B$ in case where the pressure $P_B$ of the gas chamber 31b becomes the pressure $P_A$ due to discharge of the hydraulic fluid of the volume $V_U$ from the accumulator 25 is entered for the pressure $P_X$ in the numerical formula (Equation (3)) converting the pressure $P_X$ of the gas chamber 31b of the accumulator 25 to the pressure $P_C$ received by the plunger 5 from the molding material, to calculate the pressure $P_C$ as the maximum final pressure (maximum casting pressure $P_{Cmax}$) (step ST3), and judges whether the target value of the final pressure which is input through the input device 35 is the maximum final pressure or more (step ST6).

Accordingly, for example, in the same way as the operation relating to the minimum casting pressure $P_{Cmin}$, when the target value of the casting pressure $P_C$ which is received is larger than the maximum casting pressure $P_{Cmax}$, this is informed to the worker by the control device 11 and/or the molding cycle is started only at the time when the target value of the casting pressure $P_C$ which is received is the maximum casting pressure $P_{Cmax}$ or less. Due to this, the load of the worker is lightened and reduced. Further, the chance of production of inferior goods and chance of excessive load being applied to the accumulator 25 are reduced.

Further, in the present embodiment, the hydraulic fluid supply device 26 has the pump 23 for supplying the hydraulic fluid to the accumulator 25 and a control valve (first valve 29A) for permitting or prohibiting the flow of the hydraulic fluid from the pump 23 to the accumulator 25. The control device 11 controls the hydraulic fluid supply device 26 so that the flow of the hydraulic fluid from the pump 23 to the accumulator 25 is prohibited by the first valve 29A at the time when the detection value of the pressure sensor 37 reaches the target gas pressure before injection (target value of the pressure $P_B$) in the state where the hydraulic fluid is supplied from the pump 23 to the accumulator 25 in the molding cycle.

Accordingly, at the time when the pressure of the gas chamber 31b reaches the target value, by the first valve 29A, the pressure accumulation of the accumulator 25 is smoothly suspended, and the pressure $P_B$ before injection can be rendered the target value. Combined with direct detection of the pressure of the gas chamber 31b by the pressure sensor 37, the desired casting pressure $P_C$ can be obtained more correctly.

Second Embodiment

Figure 6:
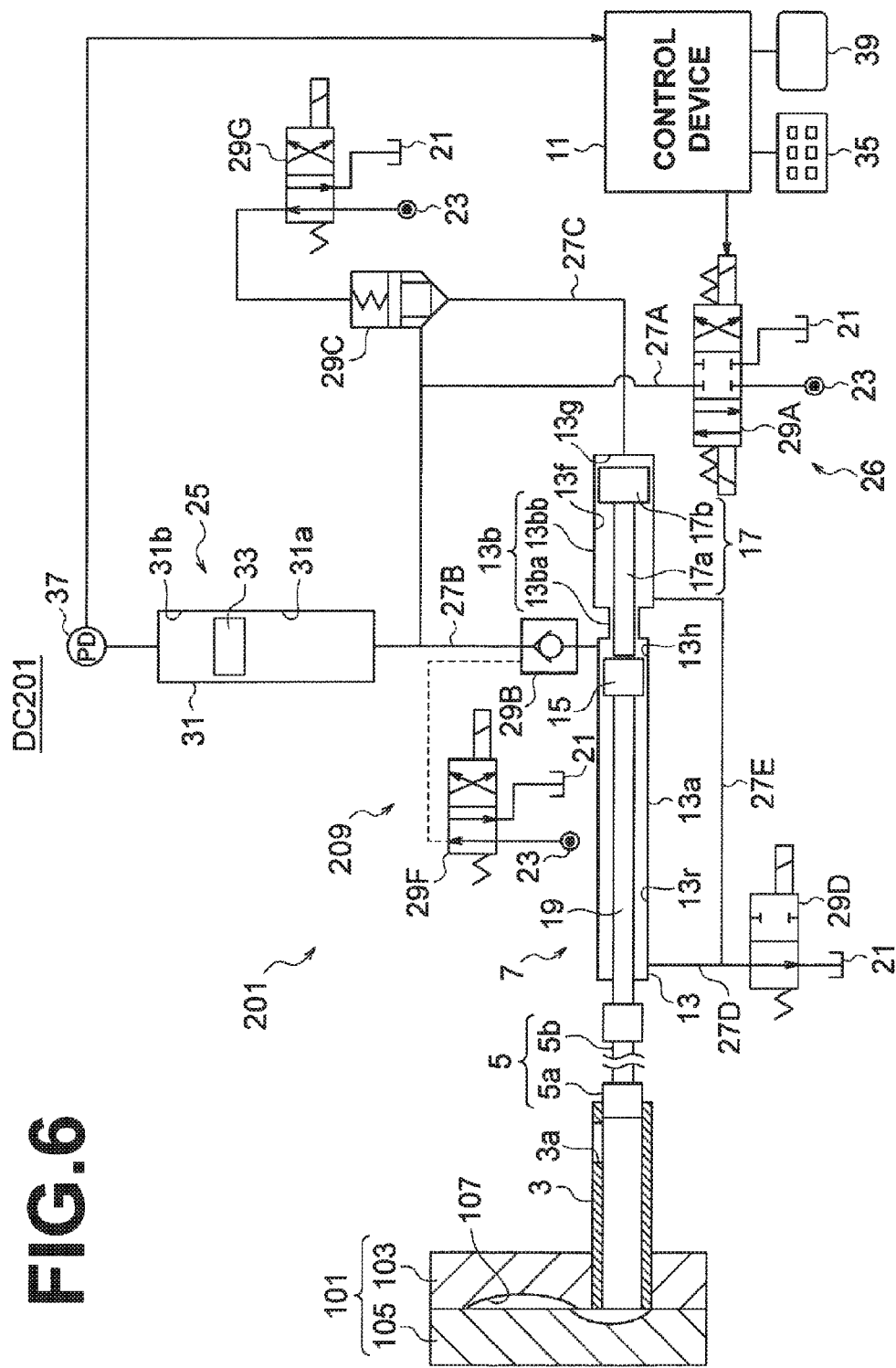
FIG. 6 A schematic view showing the configuration of the principal parts of an injection device of a die casting machine according to a second embodiment of the present invention.

FIG. 6 is a schematic view showing the configuration of the principal parts of a die casting machine DC201 according to a second embodiment of the present invention.

An injection device 201 of the die casting machine DC201, in the same way as the injection device disclosed in Patent Literature 2, prohibits the discharge of the hydraulic fluid from the rod side chamber 13r at a suitable timing during boosting. Along with this, the numerical formulas in the first embodiment are suitably modified. The other factors are the same as those of the first embodiment. Specifically, this is as follows.

A hydraulic fluid pressure device 209 in the injection device 201 has a fourth valve 29D which is provided in the fourth flow path 27D and is capable of permitting or prohibiting the discharge of the hydraulic fluid from the rod side chamber 13r. In the present embodiment, the fourth valve 29D is provided in a common area by the fourth flow path 27D and the fifth flow path 27E, so that together with permission and prohibition of discharge of the hydraulic fluid from the rod side chamber 13r, also permission or prohibition of discharge of the hydraulic fluid from the front side chamber 13f is carried out. The fourth valve 29D is for example configured by a direction control valve, more specifically, for example, is configured by a 2-port 2-position switching valve which is driven by a spring and electromagnet.

The fourth valve 29D is provided in the common area of the fourth flow path 27D and fifth flow path 27E, and the connection between the rod side chamber 13r and the front side chamber 13f is maintained in boosting. Therefore, in the same way as the first embodiment, $P_R=P_E$ stands (below, sometimes use is made of $P_R$ as the representative of the two). Note, before the molten metal reaches the final pressure, the discharge of the hydraulic fluid from the rod side chamber 13r and front side chamber 13f is prohibited by the fourth valve 29D. Therefore, when the molten metal reaches the final pressure, $P_R \neq 0$.

Accordingly, the equation for balancing the forces applied to the plunger at the time when the molten metal reaches the final pressure becomes as in the following description:

$$P_C \times A_C = P_H \times A_H - P_R \times (A_H - A_R) \qquad (1)'$$

Further, the equation for balancing the forces applied to the boosting piston 17 at the time when the molten metal reaches the final pressure becomes as in the following description:

$$P_H \times Z_R = P_X \times Z_H + P_R \times (Z_H - Z_R) \qquad (2)'$$

In the same way as derivation of Equation (3) and Equation (4) from Equation (1) and Equation (2) in the first embodiment, based on Equation (1)' and Equation (2)', an equation for converting the pressure $P_X$ of the gas chamber 31b to the casting pressure $P_C$, and conversely, an equation for converting the casting pressure $P_C$ to the pressure $P_X$ of the gas chamber 31b are obtained. In those equations, other than the fixed values ($A_C$, $A_H$, $A_R$, $Z_R$, and $Z_H$) which are determined according to the configuration of the injection device 201, the pressure $P_R$ is included. However, if this pressure $P_R$ is suitably set, in the same way as the first embodiment, the target value of the pressure $P_B$ before injection can be calculated from the casting pressure $P_C$.

The pressure $P_R$, for example, may be input through the input device 35 or may be calculated based on a predetermined numerical formula based on the pressure $P_0$ and/or $P_{max}$ by the control device 11. Further, after the input of the target value of the casting pressure $P_C$, it may be calculated based on that target value. The injection device 201 for example has a not shown pressure sensor for detecting the pressure of the rod side chamber 13r. In boosting, when the pressure of that pressure sensor reaches the set pressure $P_R$, discharge of the hydraulic fluid from the rod side chamber 13r and front side chamber 13f is prohibited by the fourth valve 29D.

Further, Equation (5), Equations (7) to (9), and Equations (11) to (13) in the first embodiment are the same also in the second embodiment. Further, equations corresponding to Equation (6), Equation (10), and Equation (14) in the first embodiment may be derived in the same way as the first embodiment based on the transformations explained above which are obtained from Equation (1)' and Equation (2)'.

Third Embodiment

Figure 7:
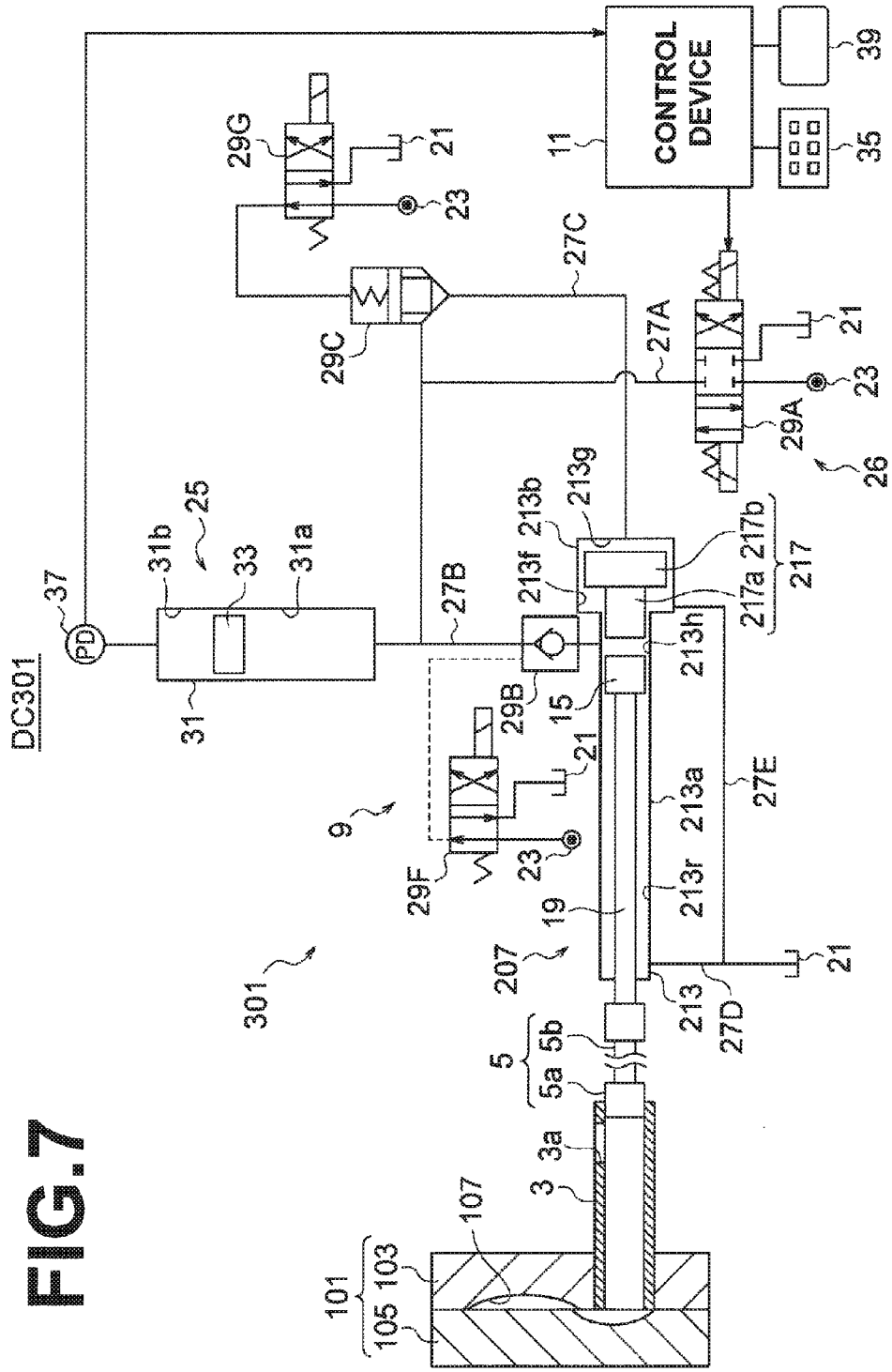
FIG. 7 A schematic view showing the configuration of the principal parts of an injection device of a die casting machine according to a third embodiment of the present invention.

FIG. 7 is a schematic view showing the configuration of the principal parts of a die casting machine DC301 according to a third embodiment of the present invention.

An injection device 301 in the die casting machine DC301 differs from the first embodiment in the configuration of the boosting portion of an injection cylinder 207. Specifically, in a cylinder portion 213 of the injection cylinder 207, a boosting cylinder portion 213b is configured as a cylinder having a constant cross-section. Further, a small diameter piston portion 217a of the boosting piston 217 is given the same diameter as that of the injection piston 15 and is inserted in the rear end of an injection cylinder portion 213a so that it can slide. That is, the rear end part of the injection cylinder portion 213a acts also as the small diameter cylinder portion 13ba in the first embodiment.

Note that, the point that the injection piston 15 partitions the internal portion of the injection cylinder portion 213a into a rod side chamber 213r and head side chamber 213h and the point that the large diameter piston portion 217b of the boosting piston 217 partitions the internal portion of the boosting cylinder portion 213b (corresponding to the large diameter cylinder portion 13bb in the first embodiment) into a front side chamber 213f and rear side chamber 213g are the same as those in the first embodiment.

In this configuration, $A_H = Z_R$. Accordingly, Equation (3) and Equation (4) in the first embodiment are simplified as in the following way:

$$P_C = P_X \times Z_H / A_C \qquad (3)''$$

$$P_X = P_C \times A_C / Z_H \qquad (4)''$$

In the same way, the other equations are simplified as well.

Note that, the third embodiment was explained predicated on the first embodiment. However, the hydraulic pressure device 209 in the second embodiment which prohibits discharge of the hydraulic fluid in the rod side chamber 13r at the time of boosting and the injection cylinder 207 in the third embodiment may be combined. In this case as well, the numerical formulae are simplified according to $A_H = Z_R$.

Fourth Embodiment

Figure 8:
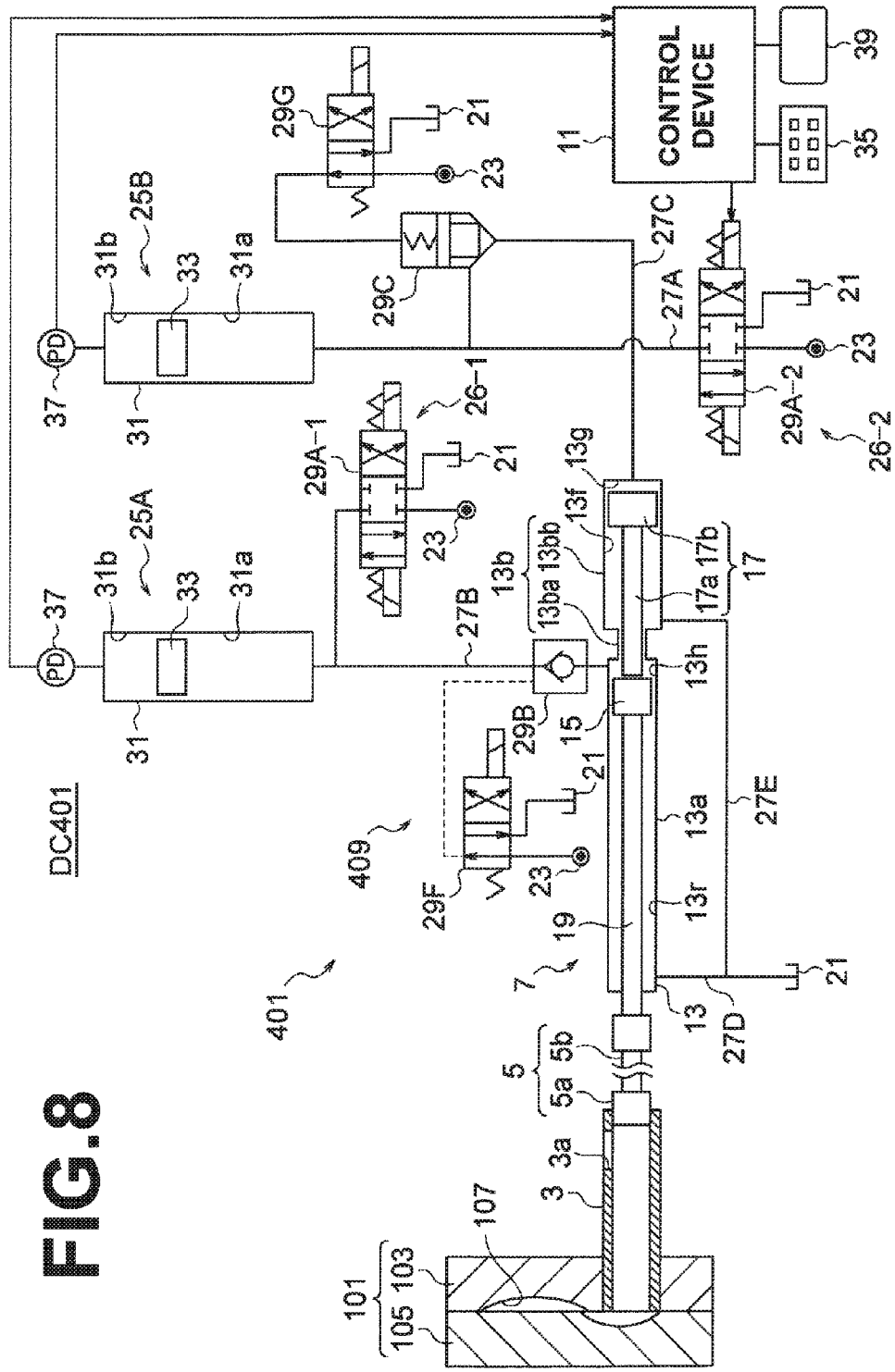
FIG. 8 A schematic view showing the configuration of the principal parts of an injection device of a die casting machine according to a fourth embodiment of the present invention.

FIG. 8 is a schematic view showing the configuration of the principal parts of a die casting machine DC 401 according to a fourth embodiment of the present invention.

In the first embodiment, the accumulator 25 of the hydraulic pressure device 9 was utilized for both of injection (in a narrow sense) and boosting. Contrary to this, in an injection device 401 of the die casting machine DC401 in the present embodiment, a hydraulic pressure device 409 including an injection-use accumulator 25A and boosting-use accumulator 25B is provided.

The injection-use accumulator 25A can supply the hydraulic fluid through the second valve 29B to the head side chamber 13h. Further, the injection-use accumulator 25A accumulates pressure by a hydraulic fluid supply device 26-1 configured by the pump 23 and a valve 29A-1 the same as the first valve 29A in the first embodiment.

The boosting-use accumulator 25B can supply the hydraulic fluid through the third valve 29C to the rear side chamber 13g. Further, the boosting-use accumulator 25B accumulates pressure by a hydraulic fluid supply device 26-2 configured by the pump 23 and a valve 29A-2 the same as the first valve 29A in the first embodiment.

At the low speed injection and high speed injection, the injection device 401, for example, permits the flow of the hydraulic fluid from the injection-use accumulator 25A to the head side chamber 13h and prohibits the flow of the hydraulic fluid from the boosting-use accumulator 25B to the rear side chamber 13g by the third valve 29C. After that, the injection device 401 prohibits the flow of the hydraulic fluid from the injection-use accumulator 25A to the head side chamber 13h by a not shown valve and permits the flow of the hydraulic fluid from the boosting-use accumulator 25B to the rear side chamber 13g. Further, by balancing the force received at the plunger 5 from the molten metal and the force which is applied by the boosting-use accumulator 25B to the plunger 5 through the injection cylinder 7, the pressure of the molten metal converges to a constant value (reaches the final pressure).

Even with such a configuration, for example, by calculating the target value of the pressure $P_B$ before injection of the boosting-use accumulator 25B in accordance with the target value of the casting pressure $P_C$ and accumulating pressure of the boosting-use accumulator 25B up to that target value, the desired casting pressure $P_C$ can be obtained. Note that, the fourth embodiment was explained predicated on the first embodiment. However, the injection-use accumulator 25A and boosting-use accumulator 25B may be provided as well in the second and third embodiments or the combination of them.

In the above embodiments, the die casting machines DC1, DC201, DC301, and DC401 are examples of the molding apparatus, while the molten metal is an example of the molding material.

The present invention is not limited to the above embodiments and may be worked in various ways.

The molding machine is not limited to a die casting machine. For example, the molding machine may be another metal molding machine, may be a plastic injection molding machine, and may be a molding machine for molding a material obtained by mixing a thermoplastic resin or the like with sawdust. Further, the injection device is not limited to horizontal clamping and horizontal injection and may be for example vertical clamping and vertical injection, horizontal clamping and vertical injection, or vertical clamping and horizontal injection as well. The hydraulic fluid is not limited to oil and may be for example water as well.

The injection device is not limited to one performing all processes including injection and boosting by hydraulic pressure. For example, the low speed injection may be carried out by transmission of driving power of an electric motor to the plunger without going through a hydraulic fluid as well. That is, the injection device may not be a "full hydraulic type", but may be as so-called "hybrid type".

The injection cylinder is not limited to A boosting type and may be one having only an injection cylinder portion and injection piston as well. In this case, the equation for balancing forces of the plunger becomes $P_C \times A_C = P_X \times A_H$, therefore the equations corresponding to Equation (3) and Equation (4) in the above embodiments become as follows:

$$P_C = P_X \times A_H / A_C \quad (3a)$$

$$P_X = P_C \times A_C / A_H \quad (4a)$$

Note that, in the numerical formulas, this corresponds to replacement as $Z_H/Z_R = 1$ in the first embodiment. Equations corresponding to the other equations in the first embodiment may be derived in the same way as the first embodiment by using Equation (3a) and Equation (4a) in place of Equation (3) and Equation (4).

Further, the boosting type injection cylinder is not limited to the direct coupled one, but may be a cylinder in which the injection cylinder portion and the boosting cylinder portion are separated from each other and are connected by a flow path as well. Further, in the boosting type injection cylinder, the rod side chamber and the front side chamber may not be made the same pressure either. The equations in this case as well can be derived in the same way as the embodiments.

In the case where the boosting cylinder portion (13b) has the small diameter cylinder portion (13ba) and large diameter cylinder portion (13bb) as in the first embodiment, the boosting action is obtained so far as the diameter of the large diameter cylinder portion is larger than the diameter of the small diameter cylinder portion. Therefore, the relationship between the diameter of the injection cylinder portion and the diameter of the boosting cylinder portion may be suitably set. For example, the diameter of the large diameter cylinder portion may be the same as or smaller than the diameter of the injection cylinder portion 13a.

The accumulator only has to be one obtaining the force for discharging the hydraulic fluid by compression of a gas (gas pressure type in a broad sense) and is not limited to the cylinder type. For example, the accumulator may be a bladder type or may be a type in which the gas and the hydraulic fluid contact (gas pressure type in a narrow sense). Further, the cylinder type accumulator may be one in which the pressurized area in the gas chamber and the pressurized area in the liquid chamber of the piston are different.

The configuration for supplying the hydraulic fluid to the accumulator is not limited to the combination of the pump and the control valve. For example, the hydraulic fluid may be supplied from the cylinder to the accumulator by driving the piston of the cylinder by an electric motor as well. Further, the amount of supply of the hydraulic fluid may be controlled not according to the opening and closing of the control valve, but according to the operation of the pump and stopping thereof or the movement and stopping of the piston described above.

The numerical formulas are not limited to those exemplified in the embodiments. For example, a numerical formula adding the influence of temperature etc. may be utilized as well.

Priority is claimed on Japanese application No. 2015-066045, filed on Mar. 27, 2015, the content of which is incorporated herein by reference.

REFERENCE SIGNS LIST

1 . . . injection device, 5 . . . plunger, 7 . . . injection cylinder, 11 . . . control device, 25 . . . accumulator, 26 . . . hydraulic fluid supply device, and 37 . . . pressure sensor.

The invention claimed is:
1. An injection device comprising:
an injection cylinder for driving a plunger,
a gas pressure type accumulator which supplies a hydraulic fluid to the injection cylinder,
a hydraulic fluid supply device which supplies the hydraulic fluid to the accumulator,
a pressure sensor for detecting gas pressure of the accumulator,
an input device which accepts input of a target value of final pressure of a molding material; and
a control device which controls the hydraulic fluid supply device so as to suspend the supply of the hydraulic fluid when a detection value of the pressure sensor reaches a predetermined target gas pressure before injection in a state where the hydraulic fluid is supplied from the hydraulic fluid supply device to the accumulator in a molding cycle, wherein
the accumulator comprises a piston for separating the hydraulic fluid and gas, and
the control device sets the target gas pressure before injection based on the target value of the final pressure which is input.

2. The injection device according to claim 1, wherein the control device calculates a pressure $P_B$ as the target gas pressure before injection by entering the target value of the final pressure which is input for a pressure $P_C$ in a numerical formula in which a pressure $P_X$ obtained by a numerical formula converting the pressure $P_C$ which the plunger receives from the molding material to the pressure $P_X$ of a gas chamber of the accumulator is entered for a pressure $P_A$ in a numerical formula calculating the pressure $P_B$ of the gas chamber at the time when a hydraulic fluid having a volume $V_U$ is supplied to the accumulator having the pressure $P_A$ of the gas chamber.

3. The injection device according to claim 1, wherein the control device
- enters the target value of the final pressure which is input for a pressure $P_C$ in a numerical formula converting the pressure $P_C$ which the plunger receives from the molding material to a pressure $P_X$ of a gas chamber of the accumulator to calculate the pressure $P_X$ as a target gas pressure after injection and
- sets the target gas pressure before injection of the next molding cycle based on that calculated target gas pressure after injection and a detection value of the pressure sensor after injection.

4. The injection device according to claim 1, wherein the control device
- enters a detection value of the pressure sensor in a state where the hydraulic fluid is wholly discharged from the accumulator for a pressure $P_X$ in a numerical formula converting the pressure $P_X$ of a gas chamber in the accumulator to a pressure $P_C$ which the plunger receives from the molding material to calculate the pressure $P_C$ as the minimum final pressure and
- judges whether the target value of the final pressure which is input is the minimum final pressure or more.

5. The injection device according to claim 1, wherein the control device
- enters a value which is input from the input device or a constant value which the control device holds for a pressure $P_B$ in a numerical formula in which a pressure $P_A$ obtained by a numerical formula calculating the pressure $P_A$ based on the pressure $P_B$ in case where the pressure $P_B$ of a gas chamber becomes the pressure $P_A$ due to discharge of the hydraulic fluid of a volume $V_U$ from the accumulator is entered for a pressure $P_X$ in a numerical formula converting the pressure $P_X$ of the gas chamber of the accumulator to a pressure $P_C$ which the plunger receives from the molding material to calculate the pressure $P_C$ as a maximum final pressure, and
- judges whether the target value of the final pressure which is input is the maximum final pressure or less.

6. The injection device according to claim 1, wherein the hydraulic fluid supply device has
- a pump for supplying the hydraulic fluid to the accumulator and
- a control valve for permitting or prohibiting the flow of the hydraulic fluid from the pump to the accumulator, and
- the control device controls the hydraulic fluid supply device so that the flow of the hydraulic fluid from the pump to the accumulator is prohibited by the control valve at the time when the detection value of the pressure sensor reaches the target gas pressure before injection in a state where the hydraulic fluid is supplied from the pump to the accumulator in the molding cycle.

7. A molding apparatus comprising an injection device according to claim 1.

* * * * *